July 21, 1953     M. A. WECKERLY     2,646,274
SPRING WEIGHING SCALE
Filed Sept. 4, 1947     2 Sheets-Sheet 1
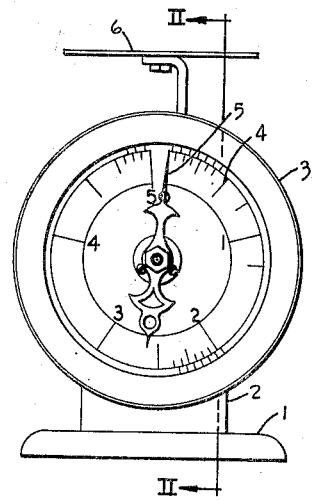
Fig. I
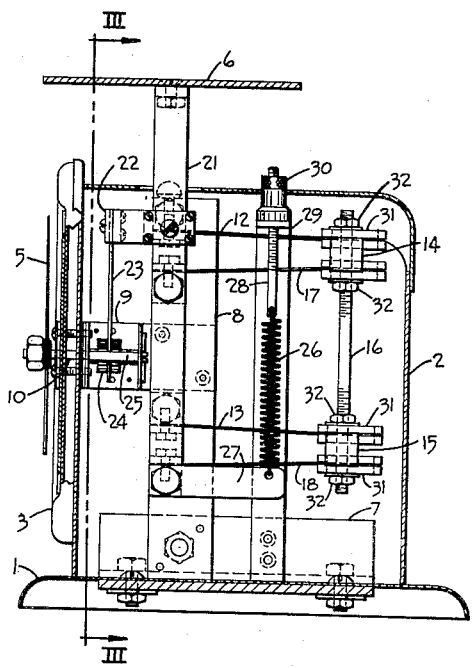
Fig. II
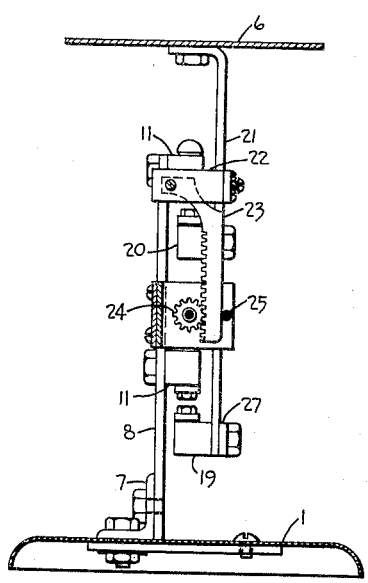
Fig. III
INVENTOR.
Mark A. Weckerly
BY Marshall and Marshall
ATTORNEYS July 21, 1953     M. A. WECKERLY     2,646,274
SPRING WEIGHING SCALE
Filed Sept. 4, 1947     2 Sheets-Sheet 2
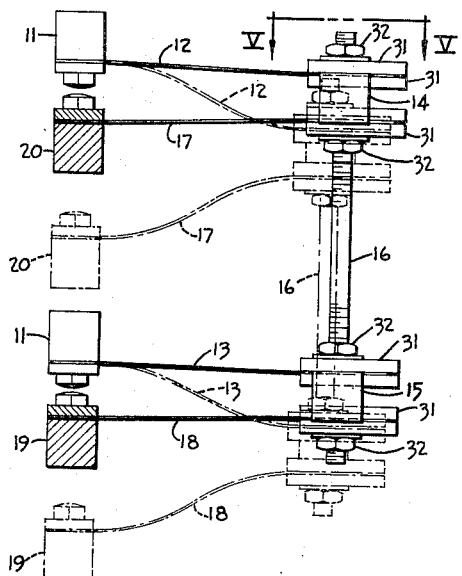
Fig. IV
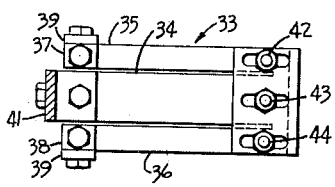
Fig. VI
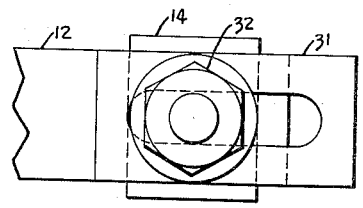
Fig. V
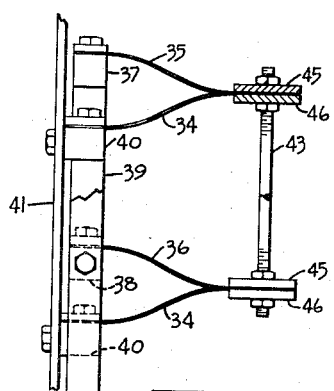
Fig. VII
INVENTOR.
Mark A. Weckerly
BY Marshall and Marshall
ATTORNEYS Patented July 21, 1953

2,646,274

UNITED STATES PATENT OFFICE 2,646,274

SPRING WEIGHING SCALES

Mark A. Weckerly, Toledo, Ohio, assignor to Toledo Scale Company, Toledo, Ohio, a corporation of New Jersey Application September 4, 1947, Serial No. 772,075

2 Claims. (Cl. 265—68)

This invention relates to weighing scales and in particular to a weighing scale employing a plurality of cantilever springs for supporting and guiding a load receiver.

While spring scales employing a pair of cantilever springs to support a load receiver have been constructed these scales in general have not proven satisfactory because of the changes in load indication resulting from changes in position of the load on the load receiver of the scale or from changes in the condition of level of the scale. If the load receiver of a weighing scale is supported on a pair of cantilever springs and the scale is tipped so that the springs tend to incline downwardly toward their connection to the load receiver the indicated load is less than the actual load on the load receiver. If, on the other hand, the scale is tipped so that the springs incline upwardly toward their connection to the load receiver the indication of load is usually greater than the actual load on the scale. These changes in load indication with the condition of level of the weighing scale result because the path of movement of the load receiver is not a straight line but rather is an arc having a radius approximately equal to the length of the cantilever springs supporting the load receiver. The horizontal component of motion resulting from movement of the load receiver along the arcuate path accounts for the change in load indication as the weighing scale is tipped out of level.

The principal object of this invention is to provide a weighing scale employing cantilever springs that are arranged in a manner such that the load receiver moves along a straight path.

Another object of the invention is to provide an arrangement of cantilever springs so that not only is the load on the load receiver supported by the springs but also the springs serve to guide the load receiver so that there are no points of sliding friction to produce errors in load indication.

A still further object of the invention is to provide means for changing the effective length of the cantilever springs for changing the indication of load without changing the location of the load receiver or indicating mechanism with respect to the remainder of the weighing scale.

More specific objects and advantages are apparent from the following description of a weighing scale embodying the invention.

According to the invention a straight line path of movement for the load receiver of the weighing scale is obtained by using a plurality of cantilever springs or spring elements arranged in pairs with the springs of each pair connected together at one end and at their other ends connected one to the base of the scale and the other to the load receiver. By using the cantilever springs in pairs the connection between the two springs of each pair is allowed to move along a generally arcuate path but because of the symmetry between the springs the load receiver end of the pair of springs moves along a substantially straight path.

A weighing scale employing cantilever springs assembled in pairs is illustrated in the accompanying drawings.

In the drawings:

Figure I is a front elevation of the improved weighing scale.

Figure II is a side elevation, partly in section, as seen from the line II—II of Figure I.

Figure III is a front elevation, partly in section, as seen from line III—III of Figure II after the housing of the scale has been removed.

Figure IV is a side elevation of the assembly of cantilever springs employed to support the load receiver of the scale.

Figure V is a detailed view of the spring adjusting means as seen from the line V—V of Figure IV.

Figure VI is a plan view of a modified arrangement of cantilver spring for a weighing scale.

Figure VII is a side elevation of the spring assembly of a weighing scale employing cantilever springs as shown in Figure VI.

These specific figures and the accompanying description are intended merely to illustrate the invention but not to impose limitations on the claims.

A simple weighing scale embodying the invention includes a base 1 on which is erected a housing 2 that carries a dial 3 having suitable weight indicia 4 printed or otherwise marked thereon. An indicator 5 is rotated according to the weight of loads placed on a load receiver 6 and cooperates with the indicia 4 to indicate the magnitude of the load.

Referring to Figure II the base 1 is provided with an angle iron 7 serving as a bracket to support an upright frame 8 to which is attached a forwardly extending bracket 9 that carries the inner portion of the dial 3 and that journals a shaft 10 carrying the indicator 5. The upright frame 8 also carries a pair of blocks 11 that serve as the fixed supports for cantilever springs 12 and 13. The free ends of the cantilever springs 12 and 13 carry junction blocks 14 and 15 that are interconnected by a strut 16. Other cantilever springs 17 and 18 are attached to the junction blocks 14 and 15, and, extending generally parallel to the cantilever springs 12 and 13 respectively, are connected to horizontal portions 19 and 20 (Figure III) of a vertical member 21 that supports the load receiver 6.

The cantilever springs 12, 13, 17, and 18 serve as a resilient support for the member 21 to which the load forces are applied and the movement of the member 21 is transmitted through an arm 22 clamped to the upright 21 and rack 23 to a pinion 24 mounted on the indicator shaft 10. The rack 23 is pivotally connected to the arm 22 in a manner such that it rests against the pinion 24 and its own weight serves to hold it in mesh with the pinion 24. A small rod 25 mounted in the bracket 9 and spaced slightly from the back of the rack 23 prevents loss of registration between the teeth of the rack and the pinion during sudden changes in loading.

Referring to Figure II, a helical tension spring 26 engages at its lower end an arm 27 attached to the upright member 21 and at its upper end is suspended from a threaded rod 28 that passes through a hole in the upper end of a standard 29 erected from the base 1 and that is adjustably secured by a knurled adjusting nut 30. The nut 30 protrudes above the upper portion of the housing 2 and by its adjustment the pull of the helical spring 26 is varied until the indicator 5 is brought into registration with the zero indicium of the chart 3 when there is no load on the load receiver.

The cantilever springs 12 and 17 form one set and the springs 13 and 18 form a second set of connected cantilever springs. The deflection characteristics of the springs are similar and their lengths are generally equal so that the junction blocks 14 and 15 and the strut 16 partake of approximately half of the vertical travel of the vertical member 21 supporting the load receiver 6. (See Figure IV.) Since the springs of each set are of substantially equal length and equal deflection characteristics the portions 19 and 20 of the load receiver supporting member 21 move along a straight line even though the junction blocks 14 and 15 and the strut 16 move along an arcuate path that approaches the upright member 21 as the member 21 moves downwardly. This arrangement of cantilever springs connected in pairs eliminates all of the error that would otherwise be introduced because of tipping of the scale and in addition provides a comparatively large deflection to permit the use of a large pinion without introducing high stresses into the spring material.

The effective length of the cantilever springs and thus their deflection per unit of load is adjusted by means of slotted clamps 31 (see also Figure V) that are interposed between the junction blocks 14 and 15 and the cantilever springs and that are clamped in place by nuts 32 threaded on the strut 16. The cantilever springs themselves are not slotted so that loosening the nuts 32 to adjust the position of the clamps 31 does not permit any relative movement in a horizontal direction between the upright member 21 carrying the load receiver 6 and the upright 8 erected from the base 1 of the scale. The only requirement in adjusting the length of the cantilever springs is that the springs of each set should be kept substantially equal in length in order that the corresponding portions 19 or 20 shall move along a straight line. In the weighing scale shown in the drawings the cantilever springs 12, 13, 17, and 18 are made of equal length, width, and thickness and are punched near each end to receive the bolts that clamp them to the upright frame 8, the vertical member 21, or to the junction blocks on the threaded strut 16. In this way the strut 16 is held parallel to the vertical member 21 and this adjustment is not lost when the nuts 32 are loosened to allow adjustment of the clamps 31. Furthermore, the junction blocks 14 and 15 maintain parallelism between the connected ends of the springs so that the deflection of each spring of each set is symmetrical end for end as well as being symmetrical with respect to deflection of the other spring of the set.

Substantially similar results, except for the ease of adjustment, are obtained if the junction blocks 14 and 15 are eliminated and the springs of each set are connected by a hinge joint. It is of course necessary in order to stabilize the scale against shift errors, i. e., errors in indication resulting from moving the load from one position to another on the load receiver, to use a strut to interconnect the hinges forming the junction points between the springs of each set. The hinged structure is inferior to the clamping arrangement illustrated in the drawings because of the friction arising at the hinge pin.

It is not necessary that individual springs be used as the springs for each set of cantilever springs nor is it necessary that the springs of each set be located one above the other. Figure VI shows a plan view of a modified spring 33 that produces equally satisfactory results. This spring is in the shape of an E and is formed by taking a flat piece of spring stock and slitting it from one end to form three leaves the center leaf 34 being equal in width to the sum of the widths of the other two leaves 35 and 36. The outside or narrow leaves 35 and 36 are connected to horizontal portions 37 and 38 of vertical frame members 39 of a weighing scale. The center or wider leaves 34 are connected to horizontally directed portions 40 of an upright member 41 that, at its upper end, carries a load receiver similar to the load receiver 6.

The other end of the spring 33, the back of the E shape, is solid for the full width of the spring and is drilled to receive a series of bolts 42, 43, and 44 that serve to clamp plates 45 and 46 to the upper and lower surfaces of the spring 33. The center bolt 43 is made long enough to interconnect the two E-shaped springs 33 that together support and guide the vertical member 41 carrying the load receiver. The bolt 43 thus serves the same function as the strut 16. The plates 45 and 46 are slotted so that they may be adjusted along the length of the spring 33 to vary its effective length and thus the deflection of the member 41 for a given increment of load.

In this example each set of cantilever springs is formed from one piece of spring stock by slitting the spring lengthwise. Whether the springs are made in this form or are joined by coupling blocks such as the blocks 14 and 15 they still constitute a set of connected springs that are connected one to the frame of the scale and the other to a force receiving or load supporting member. In either case the deflection characteristics of the connected springs are chosen so that the connected point moves approximately half as far as the supported member and that the shortening of the horizontal projection of each of the connected springs compensates for the shortening of the other so that the load receiver follows a straight path.

Various modifications in the details of construction or adjustment may be made without departing from the spirit and scope of the invention.

Having described the invention, I claim:

1. In a force measuring device, in combination, a base, a member subjected to the force to be measured, at least two sets of cantilever springs for supporting and guiding the member with respect to the base, each set of springs comprising two connected springs having generally similar deflection characteristics extending in the same general direction and connected one to the member and one to the base, a strut interconnecting the junctions of the sets of springs, said strut being fixed in the springs against movement lengthwise of the springs, and adjustable clamp means operatively connected to the strut and springs for varying the active length of the springs.

2. In a force measuring device according to claim 1, a helical extension spring extending generally parallel to the path of the force receiving member and connected to the member, and means adjustably mounted on the base for supporting the helical spring.

MARK A. WECKERLY.

References Cited in the file of this patent

UNITED STATES PATENTS

| Number | Name | Date |
| --- | --- | --- |
| 66,524 | Shaler | July 9, 1867 |
| 69,774 | Cox | Oct. 15, 1867 |
| 371,920 | Both | Oct. 25, 1887 |
| 1,812,937 | Dollack | July 7, 1931 |
| 1,885,356 | Karrer | Nov. 1, 1932 |
| 2,220,164 | List | Nov. 5, 1940 |
| 2,448,133 | Yorgiadis | Aug. 31, 1948 |

FOREIGN PATENTS

| Number | Country | Date |
| --- | --- | --- |
| 227,451 | Germany | Oct. 22, 1910 |
| 598,580 | Germany | June 13, 1934 |